May 28, 1963   R. T. JONES   3,091,547
METHOD OF IMPARTING A PERMANENT FORM TO
RESIN-IMPREGNATED WEBBING
Filed Jan. 8, 1959
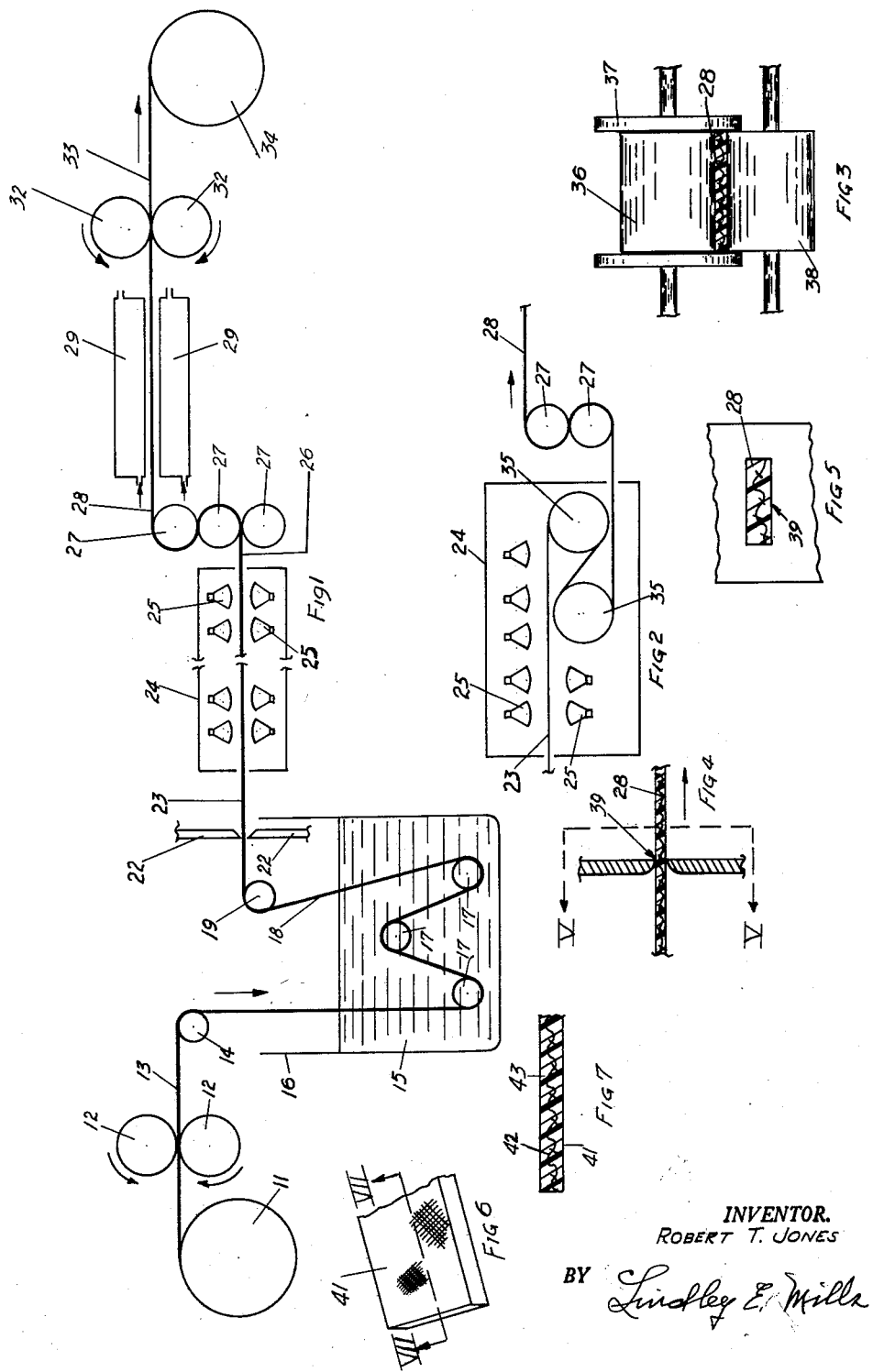
INVENTOR.
ROBERT T. JONES
BY

United States Patent Office 3,091,547
Patented May 28, 1963

3,091,547
METHOD OF IMPARTING A PERMANENT FORM TO RESIN-IMPREGNATED WEBBING
Robert T. Jones, Barrington, Ill., assignor to Jones Products Company, Barrington, Ill., a corporation of Illinois
Filed Jan. 8, 1959, Ser. No. 785,616
9 Claims. (Cl. 117—65.2)

This invention relates to a method for making a resin-impregnated article, particularly to a method for making continuously an article comprising a fabric impregnated with a vinyl resinous composition which is characterized by a high degree of strength, a low degree of elongation under stress and a high degree of dimensional uniformity. This application is a continuation-in-part of co-pending application Serial No. 533,935, filed September 13, 1955, now U.S. Patent No. 2,867,811.

Many different kinds of articles have been made which comprise a woven fabric impregnated in a more or less thorough manner with a resinous composition. Such articles have been prepared using a variety of resins as well as a variety of forms of fabric materials and have been made employing a variety of processes. Generally speaking, such articles are formed by impregnating the fabric with the resinous composition in an uncured or partially cured more or less fluid state and then curing the composition completely, e.g. by heating, the details of the procedure and the properties of the product produced being dependent to a large degree upon the character of the resinous composition employed.

One process employed widely involves impregnating a fabric of suitable characteristics with a vinyl plastisol and subsequently heating the impregnated fabric to cure the plastisol. The plastisols employed are intimate interdispersions of a solid resin, usually a vinyl resin, and a liquid plasticizer which, upon heating, are converted to a cured, plasticized resinous composition. They are generally available as viscous pastes which may or may not be form-sustaining over moderate periods of time at ordinary temperatures. The hardness and flexibility of the finished article depends to some extent upon the properties of the particular webbing employed and, generally to a greater extent, upon the particular plastisol employed and the curing conditions to which the plastisol-impregnated webbing is subjected. A woven cotton web, or webbing, is often treated in this manner and used in place of straps of leather or the like.

Generally speaking, however, the dimensions of an impregnated web prepared by this process are subject to considerable variation using heretofore known procedures, especially when such articles are made by a continuous process where it is not convenient to effect the final curing operation in a mold or press. This condition arises from the fact that, following the impregnation of the webbing with the plastisol and prior ot the heating step, the amount of plastisol remaining associated with the fabric must be regulated. Because of the thick, viscous nature of the plastisol compositions, a scraper or doctor blade is the most convenient means to employ for stripping the excess plastisol from the impregnated webbing. Although the employment of such means while the plastisol is in a viscous, almost flowable condition is effective in regulating with considerable accuracy the total amount of plastisol remaining associated with the webbing, it is, because of the viscous adherent nature of the plastisol composition, not effective in insuring more than a moderate degree of uniformity of the thickness of the impregnated article.

Furthermore, since the curing operation is generally carried out by heating, e.g. by passing the impregnated fabric from the doctor blades directly through an oven, the effect of the heat is first to render the plastisol somewhat more fluid even than in its unheated condition. In its primary heated condition the plastisol is, therefore, subject to some flowing and sagging and the uniformity of thickness of the finished, finally cured article may have little relationship to the uniformity of thickness of the article as it leaves the doctor blade. Although certain types of plastisols, frequently referred to as "plastigels," have been prepared which are essentially form-sustaining at temperatures which may be as high as 400° F. and which, therefore, flow or sag very little during the initial stages of heat curing, it is practically impossible, for the reasons noted, to regulate the thickness of the impregnated, uncured article to a high degree of uniformity using any heretofore described procedure.

Because of the hitherto unavailability of resin-impregnated webbing of highly uniform dimensions, the utility of such articles has been limited greatly. One major application where such articles should find extensive use is in the form of straps and similar elongated strips of suitable width and thickness for binding and securing purposes. Straps of this character are conveniently secured by buckles of the type which grip the strap at any point when it is tightened and do not depend for their holding action on a tongue and hole arrangement. A major advantage of such a strap and buckle arrangement is that the strap can be secured with the precise degree of tension desired because the buckle can engage the strap at any point along its length. However, for such an arrangement to function satisfactorily it is essential that the strap be of highly uniform thickness throughout its entire length. If the strap is of variable thickness even to a minor degree, it interferes seriously with the holding of the buckle at the precise point at which it first engages the strap, since the engaging part of the buckle is inclined to slip along the strap until it engages the strap at a point of minimum thickness. Such slippage, of course, results in a loosening of the strap and renders its use untenable in instances where it must retain its original tension.

An example of an instance where the use of a strap consisting of a resin-impregnated web which, because of minor variations in its thickness, does not function as satisfactorily as could be desired is that described in the parent application relating to a chin strap for a helmet. In the parent application there is described and claimed a chin strap for a helmet which comprises a cup-shaped element adapted to fit over the point of the chin of a wearer of a helmet and which has straps secured to and extending laterally from the cup-shaped element, the free ends of the straps being secured to the sides of the helmet. The chin strap is particularly designed for use with a helmet having a semi-rigid shell with dependent jaw sections which cover the wearer's jaws and to which the ends of the chin strap are attached. It is essential for the most comfort and the best protection of the wearer against injury that the tension on the chin strap can be adjustable, e.g. by use of a buckle, to provide the best possible degree of fit of the helmet as a whole. Any slippage of the buckle or other adjusting means after its original adjustment results in a loosening of the helmet on the wearer's head with highly undesirable results. The accuracy with which the buckle must retain its original setting on the strap is all the more apparent when it is realized that the tensioning of the strap causes a certain amount of springing of the dependent jaw sections of the semi-rigid shell and that a lessening of the degree of such springing, even though by a minor amount, contributes greatly to the lack of protection afforded by the ill-fitting helmet.

Although the chin strap described and claimed in the parent application is clearly advantageous over previously known chin straps, it still possesses certain disadvantages in the way of maintenance of adjustment because of the fact that it has heretofore been impossible to prepare the resin-impregnated webbing of which the straps are constructed with the degree of uniformity of thickness required to prevent slippage of the adjusting buckle under all conditions of wear of the helmet. It is, therefore, apparent that any method or procedure for preparing a resin-impregnated web which would insure a high degree of uniformity of its dimensions would be of considerable value and would enable such articles to be used widely for purposes for which the presently available resin-impregnated webbings are unsuited because of minor variations in their dimensions.

The present invention is, therefore, concerned with a method for preparing a resin-impregnated webbing which assures the dimensions of the article after curing of the resin being as uniform as may be desired for any specific use for which the article may be intended. Employing the method, which will be described, it is convenient and economical to prepare impregnated woven webbing of substantially any width and thickness in which the variations in thickness are so slight as either to be unnoticeable or to not preclude the use of the article for essentially any purpose where its other properties would indicate it to be of value. Not only can the thickness of an impregnated webbing be controlled accurately by the process, but its width can be controlled as well. In addition, the process can be carried out rapidly and continuously and without the necessity of resorting to molds, presses and the like.

Although the method will be described with particular reference to the use of a plastisol as the resinous composition employed for impregnating the webbing, it will be apparent as the description of the invention proceeds that any other type of resinous composition can be employed, provided its properties and curing characteristics are such that it can be subjected to the procedures which will be described. It will also be further apparent that, although the method is particularly well adapted to the preparation of impregnated woven webbing, it can, without undue modification, be employed for the preparation of accurately dimensioned impregnated fibrous sheet material of virtually any sort which has the requisite strength to enable it to be operated on in the way which will be described. The terms "webbing" and "web" as employed herein refer particularly to a woven article often consisting essentially of a plurality of layers of woven fabric tied together with threads, generally referred to as "border" threads, woven into the structure to provide a multilayer unitary structure of considerable strength. Such webbing is well known in the art and need not be described further here.

According to the present method, the webbing, which is generally employed in the form of continuous lengths available in rolls of suitable size, is first passed through an impregnating zone wherein it is impregnated as thoroughly as possible with the uncured plastisol, the excess of plastisol removed and the article is then dimensioned roughly by passing it through a suitable orifice or by a doctor blade or in any other suitable manner. By this conventional part of the process the amount of plastisol associated with the webbing can be controlled with a degree of accuracy which is adequate for essentially all cases. The impregnated webbing carrying the required amount of plastistol is then passed through a heating zone, also in conventional manner, to cure the plastisol, the article issuing from the heating zone with approximately its final dimensions and with the plastisol in a cured but hot and somewhat softened and deformable condition. At this stage in the process the cured plastisol is form-sustaining even though deformable under pressure to a considerable degree and, furthermore, has little or no tendency to adhere to metal and other smooth surfaces brought into contact with it under pressure sufficient to deform the resinous composition to a considerable degree.

Advantage is taken of these characteristics of the hot, cured resinous composition to impart the desired uniform dimensions to the impregnated webbing. To attain this end the still hot impregnated webbing is conveyed through a sizing zone wherein the hot resinous composition is subjected to the pressing action of opposed, accurately spaced surfaces which deform its surfaces sufficiently to smooth them and to impart the desired dimensions to the article. The carefully dimensioned article is then conveyed through a cooling zone wherein it is free of contact with deforming surfaces until it has cooled sufficiently to cause the resinous composition to set sufficiently to become resistant to the effect of forces tending to cause its further permanent deformation.

The invention can be understood readily by reference to the accompanying drawing wherein, in the interest of clarity, certain features are shown on a somewhat exaggerated scale and wherein:

FIGURE 1 is a schematic representation of apparatus useful in carrying out the method of the invention;

FIGURE 2 is a schematic representation of an alternate modification of one part of the apparatus of FIGURE 1;

FIGURE 3 is a schematic representation of one modification of certain apparatus useful in carrying out the method of the invention;

FIGURE 4 is a schematic representation of another modification of certain apparatus useful in carrying out the method of the invention;

FIGURE 5 is a schematic view taken along the line V—V of FIGURE 4;

FIGURE 6 is an oblique view of a resin-impregnated webbing prepared in accordance with one modification of the method of the invention; and FIGURE 7 is an elevation taken along the line VII—VII of FIGURE 6.

Referring now to FIGURE 1 there is represented at 11 a supply roll of woven webbing 13 of suitable thickness and width which it is desired to impregnate with a resinous composition for subsequent heating to cure the resinous composition and to provide an impregnated cured article of precisely controlled, uniform dimensions. The webbing 13 is withdrawn from the supply roll 11, preferably by driven compression rolls 12 which regulate carefully its rate of withdrawal for purposes which will be explained later, and conveyed, e.g. over a suitable idler roll 14 through a bath of a plastisol or other suitable resinous composition 15 contained in a suitable vessel 16. For purposes of securing better penetration of the resinous composition into the interstices between the fibers in the impregnating zone within the vessel 16, the webbing 13 is preferably flexed several times during its travel beneath the surface of the resinous composition, e.g. by drawing it around suitable rods or idler rollers 17 immersed below the surface of the resinous composition.

Following its emergence from the impregnating zone, the impregnated webbing 18 is conveyed, e.g. by way of a suitable idler roller 19, to a suitable means, e.g. a pair of accurately spaced opposed doctor blades 22 or a suitable die orifice, not shown, through which it is drawn to remove from it the excess adherent resinous composition and to form a roughly sized impregnated webbing 23. The excess adherent resinous composition removed by the doctor blade is conveniently returned to the vessel 16 to avoid wastage.

The roughly sized impregnated webbing 23 is then heated, e.g. by infrared lamps 25 or other suitable heating means in an oven 24, to heat cure the resinous composition and convert it to a hot, cured, form-sustaining but still somewhat soft state in which it is deformable permanently under pressure. This is the state normally attained by heat curing the commercially available vinyl plastisols referred to previously. However, any other resinous impregnant can be employed in place of a vinyl plastisol provided that, following the heat-curing step, it is in the desired form-sustaining, permanently-deformable condition while still hot and provided further that after subsequent cooling, as will be explained, it has the necessary degree of flexibilty and resistance to permanent distortion under pressure required of the article being prepared.

Following the heat-curing step, the roughly sized article 26 comprising the webbing impregnated with the still hot, heat-cured resinous composition is subjected to the action of accurately spaced opposed sizing surfaces, such as a stack of calender rolls 27, which deform the hot resinous composition permanently so as to give it smooth surfaces spaced accurately from one another. Since this operation is carried out while the resinous composition is still hot and easily deformed permanently, but still form-sustaining, the smoothing and accurate sizing of the impregnated webbing can be effected without injuring the strength characteristics of the composition in its finally cooled state.

The accurately sized, impregnated webbing 28 is then conveyed through a cooling zone, e.g. between a pair of spaced cold plates 29 through which cold brine can be passed, in such a manner that it is prevented from contacting surfaces or objects which would deform the resinous composition further until such time as the composition has cooled sufficiently to render it non-deformable permanently by ordinary handling. In the modification of FIGURE 1 the impregnated webbing is drawn through the cooling zone by means of driven opposed pressure rolls 32 which engage the completely cooled impregnated webbing beyond the cooling zone and serve to maintain it under adequate tension during its passage through the cooling zone to prevent its coming into contact with any article or surface from the time it leaves the sizing zone, e.g. the calender rolls 27, until it is gripped by the forwarding rolls 32. Following the emergence of the accurately sized and cooled resin-impregnated webbing 33 from the forwarding rolls 32, it can be wound up on a storage roll 34 or cut into lengths or utilized in any other desired manner.

It will be appreciated that the impregnating and heating steps, as well as the step of sizing the impregnated webbing roughly before heating, can be carried out in any conventional manner and using any conventional apparatus. Furthermore, the cooling step, after accurate sizing of the impregnated web, can also be carried out in any conventional manner using suitable apparatus. Frequently the cooling step is carried out merely by prolonging the extent of travel of the accurately sized article in contact with the air.

Although the heating and cooling steps and the sizing step to impart the desired accurate dimensions to the article have been referred to previously as entirely separate steps, it should be mentioned that certain combinations of these steps are possible and are, in fact, often desirable. Thus, as illustrated in FIGURE 2, it is sometimes desirable to effect at least a part of the sizing step simultaneously with the latter part of the heating step. As is illustrated schematically in FIGURE 2, the impregnated webbing can, after removal of the excess resinous composition, be conveyed through a suitable oven 24 equipped with suitable heating means, such as infrared lamps 25 and, while still in the oven, caused to travel around driven or idler rollers 35 which effect at least a partial further sizing of the traveling article, following which the traveling article can be conveyed between calender rollers 27 to complete the accurate sizing of the traveling impregnated web. It is even sometimes convenient and desirable to locate the calender rolls themselves inside the oven to insure the accurate sizing of the traveling article being completed within the heated oven to avoid entirely any possibility of its becoming chilled before the sizing operation is completed. Such procedures are, of course, advantageous in instances where the range of temperature over which the accurate sizing operation can be effected is relatively narrow and where it is inconvenient to provide other means for being sure that the sizing operation is completed before the temperature of the traveling article falls below the desired range.

It is also entirely feasible, and sometimes desirable, to provide for heating or cooling one or more of the calender rolls 27 to further control the temperature of the traveling impregnated webbing during the actual sizing operation. Thus, it is sometimes desirable to provide heated rollers for carrying out the first part of the accurate sizing operation to prevent the traveling impregnated web from being cooled unduly by its contact with the rollers before it is completely sized. Again, it may sometimes be advantageous to chill the last one or more rollers in the calender stack contacted by the traveling article to set the resinous composition at least partially before it leaves the stack. Such procedures are sometimes advantageous when the range of temperature over which the resinous composition can be sized accurately and over which it is likely to be not entirely form-sustaining is rather wide. In such instances it can, by chilling the latter rollers in the calender stack, be assured that the resinous composition will not flow or sag in the slightest degree after it leaves the stack. In exaggerated cases it is entirely feasible, by providing a sufficient number of suitably chilled calender rollers and by adjustment of the rate of travel of the impregnated webbing through the stack, to complete the cooling step on the stack to a degree sufficient to eliminate the necessity of any separate cooling step after the impregnated webbing leaves the calender stack. It is thus seen that, although the step of sizing the article accurately can be carried out either partially or completely in combination with either the heating step or the cooling step, it, nevertheless, is an additional hitherto undisclosed step by means of which the impregnated webbing with the cured resinous composition still in a soft, permanently deformable condition is operated upon to give the article the desired dimensional accuracy.

Certain modifications of the way in which the accurate sizing step is carried out, which in view of the foregoing teaching will be easily understood, can also be practiced, if desired. Thus, using a conventional calender stack as illustrated schematically in FIGURES 1 and 2, it is apparent that, although the thickness of the traveling impregnated webbing can be regulated with a high degree of accuracy, the width of the article will depend not only upon the width of the webbing itself but to a considerable degree upon the amount of uncured resinous composition remaining associated with the webbing after the preliminary rough sizing operation, e.g. after the excess resinous composition has been removed by the doctor blades 22. As indicated previously, it is entirely feasible and often desirable to substitute an accurately dimensioned die orifice for the simple doctor blades 22 illustrated in FIGURE 1 and in this manner to control with a higher degree of accuracy the amount of uncured resinous composition remaining associated with the traveling webbing after it issues from the die orifice. In this way the width of the accurately dimensioned article 28 leaving the calender rollers 27 can be controlled more accurately than when simple doctor blades are employed. However, even in this instance there is little control of the actual configuration of the edges of the sized impregnated webbing 28. In one modification, illustrated in FIGURE 3, it is convenient to provide appropriate rollers in the calender stack, e.g. roller 36, with suitable flanges 37 at its edges which overlap an adjoining roller 38 and thus provide for forming the edges of the traveling impregnated webbing with parallel accurately spaced surfaces extending normally with respect to the parallel sides of the sized article.

Although the step of sizing the article accurately has been described thus far as being carried out employing a calender stack, it is entirely feasible and sometimes desirable to effect the final accurate sizing operation by drawing the webbing impregnated with the hot resinous composition through a suitable die orifice, such as the orifice 39 illustrated schematically in FIGURES 4 and 5, and then subsequently cooling the sized impregnated webbing.

It will be appreciated that, to insure the full dimensions of the accurately sized article at all times, it is essential that the amount of hot, cured resinous composition associated with the webbing as it enters the accurate sizing zone be at all times adequate. It will be equally apparent that it is difficult to regulate the amount of resinous composition associated with the webbing precisely and exactly to the amount required. For this reason it is preferable, but not entirely essential, when the width as well as the thickness of the finished article is to be sized accurately, to provide means for adjusting the rough sizing means employed for removing the excess uncured resinous composition from the traveling webbing. Thus provision can be made for adjusting the spacing of the doctor blades 22 or for moving one side of the orifice, referred to but not shown, with respect to the opposite side in any convenient manner. The process can then be operated with the amount of uncured resinous composition remaining associated with the webbing after the rough sizing operation being slightly greater than the amount of cured resinous composition remaining associated with the webbing after the final accurate sizing operation. Under such conditions the excess of hot, cured resinous composition tends to pile up in the nip of the sizing rollers 27, or ahead of the orifice 39, thus insuring an adequate supply of resinous composition being fed to the accurtae sizing means at all times. When the amount of resinous composition collecting in the nip of the rollers, or ahead of the orifice plate, becomes larger than is desirable, the rough sizing means can be adjusted to decrease slightly the amount of uncured resin associated with the webbing entering the curing zone.

An important modification of the process is particularly applicable to the preparation of accurately sized impregnated cotton webbing. It is known that cotton webbing is subject to considerable elongation under tension and that this property renders cotton webbing undesirable for use as straps and the like in situations where stretching of the strap during use cannot be tolerated. It is, however, characteristic of many types of cotton webbing that, when the webbing is elongated under tension, a point is reached eventually at which the rate of further elongation with a further increase in the tension applied decreases abruptly. This point is herein, for convenience, referred to as the "setting" point of the webbing and the elongation of the webbing occurring prior to the attainment of the setting point is, also for convenience, herein referred to as the "primary" elongation of the webbing. Depending upon the way the webbing is made, an increase in tension exerted on it over that required to effect its primary elongtaion may effect a further elongation, herein referred to as the "secondary" elongation of the webbing. The rate of increase in length of the webbing in the range of the secondary elongation per unit of tension applied is much less than in the range of the primary elongation. In many instances the actual secondary elongation produced by increasing the tension up to the point of damaging the webbing permanently, or breaking it, is essentially negligible. Furthermore, it is generally the case that the tension required to be exerted on the webbing to effect its primary elongation is a great deal less than that required to damage it permanently. There is thus a range of tension below the breaking tension over which straps of cotton webbing are subject to little or essentially no elongation upon increase of the tension, which is, of course, a highly desirable characteristic for many uses. Unfortunately, however, once the tension is relaxed the webbing reverts at least partially, although generally not entirely, to its original condition so that the next time it is subjected to tension it is again subject to a considerable degree of primary elongation.

Many means have been devised and employed, such as wetting the webbing thoroughly with water and drying it under high tension, in attempting to provide cotton webbing to which tension can be applied intermittently and which is not subject to the primary elongation referred to. Such procedures are reasonably successful although they have little, if any, effect in reducing the amount of secondary elongation suffered by the webbing under tension.

It will be appreciated that, when a cotton webbing is impregnated with a resinous composition according to the method described herein, it is essential, if its dimensions are to be maintained accurately under tension, that it be subject to essentially no elongation under any stress short of the breaking stress. If the accurately sized article is subject to elongation under stress, it follows that the dimensional accuracy of the stressed article will be disturbed by an amount which is proportional to the degree of elongation. For this reason it is advisable, when it is desired that the impregnated webbing retain its dimensions under stress, that the cotton webbing employed be washed thoroughly prior to impregnation to remove greases and oils and to facilitate penetration of the resinous composition as nearly completely as possible into the interstices between the individual fibers and that it then be dried under high tension to overcome as much as possible the tendency of the webbing to elongate under subsequent tension. Even when the cotton webbing is treated in this way it is still highly desirable to carry out the impregnating and sizing operation with the webbing stressed sufficiently to insure its primary elongation having been effected but, of course, not sufficiently to damage it.

This can be done conveniently, as is shown schematically in FIGURE 1, by drawing the webbing through the entire process by means of the driven rollers 32 and, at the same time, regulating the rate at which the unimpregnated webbing 13 is fed to the impregnating zone by regulating the speed of the feed rollers 12. Thus, in carrying out the process according to the preferred procedure, the peripheral speeds of the forwarding rollers 32 are maintained greater than the peripheral speeds of the feed rollers 12 by an amount sufficient to cause the webbing traveling between the respective sets of rollers to be elongated to the full extent of its primary elongation, but not sufficient to cause the webbing to be broken. In general, the major part of the elongation of the webbing occurs prior to the entry of the impregnated webbing into the stack of calender rollers 27, or into the sizing die 39, as the case may be. It has been found that, once the impregnated webbing has been sized accurately, and provided the tension is not relieved until the cooling step is completed, there is much less tendency for the webbing to relax within the range of its secondary elongation when the tension is relieved than is the case if the process is carried out with the webbing stressed to only a moderate degree. This result is not to be expected when the cured cold resinous composition with which the final webbing is impregnated is a flexible vinyl resinous composition of the type obtained by heat curing most vinyl plastisols or plastigels. It is thus entirely possible, utilizing the method of the invention, to prepare highly flexible articles useful as straps and the like, such as is illustrated at 41 of FIGURES 6 and 7, which comprise cotton webbing, 42 of FIGURE 7, impregnated with a heat-cured vinyl resinous composition 43, which are characterized by a degree of dimensional accuracy in one or more directions greater than has been possible hitherto using previously described methods and which, because of its greatly reduced degree of secondary elongation under tension up to the breaking tension, maintains its high degree of dimensional accuracy during intermittent or constant use under high tension.

Because of these properties, straps fabricated in the way described can be used with buckles, as in the case of the chin straps for helmets referred to previously, with the complete assurance that, once the buckle is adjusted to give the desired tension, no slippage of the buckle and loosening of the strap will occur under sudden or continuous stresses and, furthermore, that, when the stress is relieved, little or no relaxation and shrinkage of the article will occur.

Although the process of the invention has been described with particular reference to the preparation of articles having accurately spaced opposed parallel planar surfaces, it should be pointed out that accurately sized articles with non-planar surfaces can be prepared as well. Thus, using a suitably shaped orifice in the step of sizing the article accurately and employing a suitably woven webbing, it is entirely possible and convenient to prepare accurately dimensioned articles which are circular, triangular or star-shaped as well as rectangular in cross-sectional area. Furthermore, it is feasible and convenient using sizing rollers, the surfaces of which have raised or engraved designs on them according to embossing and intaglio procedures to produce correspondingly figured articles with a high degree of accuracy and faithfulness. Such figured articles prepared in sheet form are of value for decorative purposes.

I claim:

1. In a method for preparing an article comprising a woven webbing impregnated with a thermoplastic, resinous composition wherein the webbing is first impregnated with a plastisol resinous composition, the impregnated webbing is then heated to fuse the resinous composition and convert it to a state in which, while still hot, it is dimensionally stable but easily deformed permanently by mechanical means, and wherein the impregnated webbing is substantially cooled to set the resinous composition, the steps which include: deforming the hot fused resinous composition mechanically prior to cooling it to shape the article accurately to a predetermined dimension; and then cooling the dimensioned article while out of contact with solid surfaces to avoid further deformation of the resinous composition.

2. The method as claimed in claim 1 wherein the webbing impregnated with the hot fused resinous composition is drawn through an accurately dimensioned die orifice to effect the shaping operation.

3. The method as claimed in claim 1 wherein the webbing impregnated with the hot fused resinous composition is forwarded between the accurately spaced surfaces of opposed rollers to effect the shaping operation.

4. The method as claimed in claim 3 wherein the surface of at least one of the rollers comprises a figured surface.

5. The method of claim 1 wherein the thermoplastic resinous composition is an intimate dispersion of a vinyl resinous composition in a plasticizer and the article prepared is an accurately dimensioned flexible article.

6. The method for preparing an accurately dimensioned article comprising a woven webbing impregnated with a thermoplastic resinous composition which includes: impregnating a woven webbing thoroughly with plastisol resinous composition; removing excess resinous composition from the impregnated webbing to shape the article roughly and to regulate the amount of resinous composition remaining associated with the webbing; heating the impregnated webbing to fuse the resinous composition and convert it to a form in which it is essentially dimensionally stable but deformable permanently by mechanical means; subjecting the still hot impregnated webbing to the action of shaping surfaces to impart to it a predetermined dimension; and subsequently cooling the hot shaped, impregnated webbing out of contact with solid surfaces to set the resinous composition while avoiding further permanent deformation of the resinous composition.

7. The method as claimed in claim 6 wherein the method is carried out continuously and the webbing is forwarded by opposed forwarding rollers engaging the cooled shaped, impregnated webbing.

8. The method as claimed in claim 6 wherein the webbing employed is a woven cotton webbing, the webbing is forwarded by opposed forwarding rollers engaging the cooled, shaped, impregnated webbing, the rate of feed of the unimpregnated webbing to the process is regulated by opposed feed rollers which engage the unimpregnated webbing and the peripheral speeds of the forwarding rollers are greater than the peripheral speeds of the feed rollers by an amount sufficient to effect essentially the complete primary elongation of the webbing between the feed rollers and the forwarding rollers.

9. An article comprising a woven cotton webbing impregnated with a vinyl resinous composition characterized by its essential lack of elongation under tension up to its breaking tension and by an essentially uniform thickness which remains essentially unchanged during tensioning of the article short of its breaking tension.

References Cited in the file of this patent

UNITED STATES PATENTS

| | | |
|---|---|---|
| 2,503,024 | Boese et al. | Apr. 4, 1950 |
| 2,514,187 | Bosomworth | July 4, 1950 |
| 2,533,976 | Teague | Dec. 12, 1950 |
| 2,582,294 | Stober | Jan. 15, 1952 |
| 2,647,296 | Shive | Aug. 4, 1953 |
| 2,669,527 | Horwich | Feb. 16, 1954 |
| 2,682,292 | Nagin | June 29, 1954 |
| 2,722,495 | Hedges | Nov. 1, 1955 |
| 2,859,482 | Warren et al. | Nov. 11, 1958 |